(12) United States Patent
Lee et al.

(10) Patent No.: US 12,335,993 B2
(45) Date of Patent: Jun. 17, 2025

(54) INSERTED PPDU

(71) Applicant: Samsung Electronics Co., Ltd., Suwon-si (KR)

(72) Inventors: Wook Bong Lee, San Jose, CA (US); Ruchen Duan, Santa Clara, CA (US); Srinivas Kandala, Morgan Hill, CA (US); Ashok Ranganath, Los Gatos, CA (US); Myeongjin Kim, Seongnam-si (KR)

(73) Assignee: Samsung Electronics Co., Ltd., Yongin-si (KR)

(*) Notice: Subject to any disclaimer, the term of this patent is extended or adjusted under 35 U.S.C. 154(b) by 503 days.

(21) Appl. No.: 17/722,209

(22) Filed: Apr. 15, 2022

(65) Prior Publication Data

US 2022/0361190 A1 Nov. 10, 2022

Related U.S. Application Data

(60) Provisional application No. 63/184,686, filed on May 5, 2021.

(51) Int. Cl.
| | | |
|---|---|---|
| *H04W 72/12* | (2023.01) | |
| *H04L 5/00* | (2006.01) | |
| *H04W 52/02* | (2009.01) | |
| *H04W 72/543* | (2023.01) | |
| *H04W 84/12* | (2009.01) | |

(52) U.S. Cl.
CPC ......... *H04W 72/543* (2023.01); *H04L 5/0055* (2013.01); *H04W 52/0216* (2013.01); *H04W 84/12* (2013.01)

(58) Field of Classification Search
CPC ........... H04W 72/543; H04W 52/0216; H04W 84/12; H04W 28/0236; H04L 5/0055; H04L 1/1854; H04L 5/0048; H04L 27/2602; H04L 5/0023; H04L 69/322
See application file for complete search history.

(56) References Cited

U.S. PATENT DOCUMENTS

| | | | |
|---|---|---|---|
| 11,991,032 B2 * | 5/2024 | Son | H04W 80/02 |
| 2016/0345349 A1 * | 11/2016 | Ferdowsi | H04W 72/1268 |
| 2019/0297146 A1 | 9/2019 | Noh et al. | |
| 2021/0250215 A1 | 8/2021 | Lim et al. | |
| 2021/0266905 A1 | 8/2021 | Chen et al. | |

(Continued)

FOREIGN PATENT DOCUMENTS

WO  WO-2020096895 A1 *  5/2020  ........... H04L 1/1614

OTHER PUBLICATIONS

Rui Cao et al., "Aggregated PPDU for Large BW", doc.: IEEE 802.11-20/0693r0, May 2020, 9 pages (Year: 2020).*

*Primary Examiner* — Lan-Huong Truong
(74) *Attorney, Agent, or Firm* — Lewis Roca Rothgerber Christie LLP

(57) ABSTRACT

A system and method for managing latency in a wireless network. In some embodiments, the method includes: receiving, by a non-Access Point Station (non-AP STA), a first inserted packet; and sending, by the non-AP STA, an Acknowledgement (ACK) for the first inserted packet, the first inserted packet beginning after the beginning of a first originally scheduled Aggregated Physical layer Protocol Data Unit (A-PPDU) and being substituted for a portion of the data of the first originally scheduled A-PPDU.

20 Claims, 6 Drawing Sheets

(56) References Cited

U.S. PATENT DOCUMENTS

2021/0385115 A1    12/2021  Cao et al.
2021/0399864 A1    12/2021  Lim et al.
2024/0031059 A1*    1/2024  Park ..................... H04L 5/0092

* cited by examiner

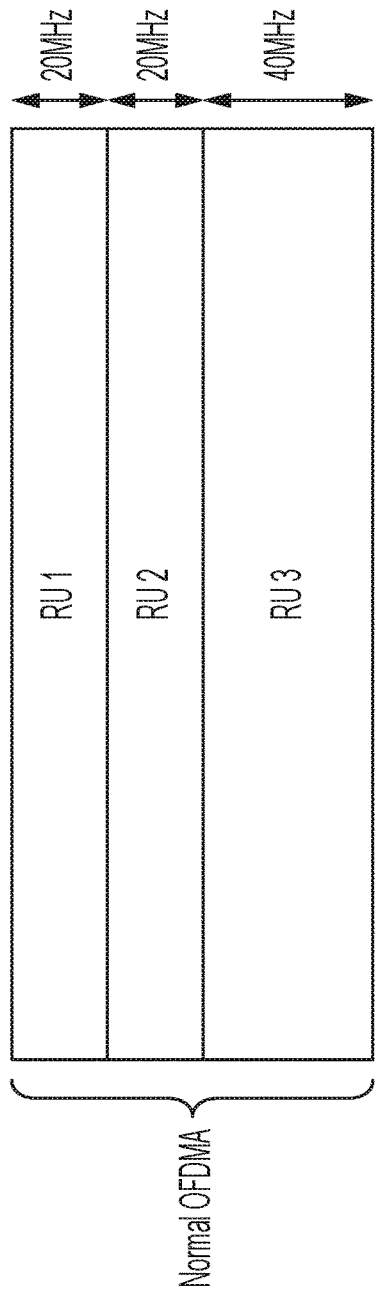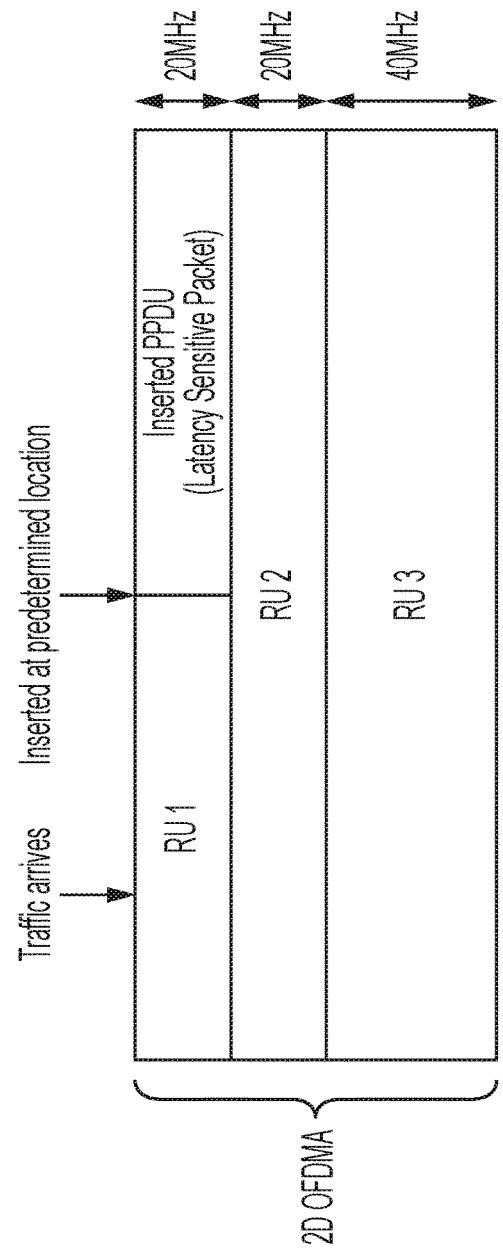

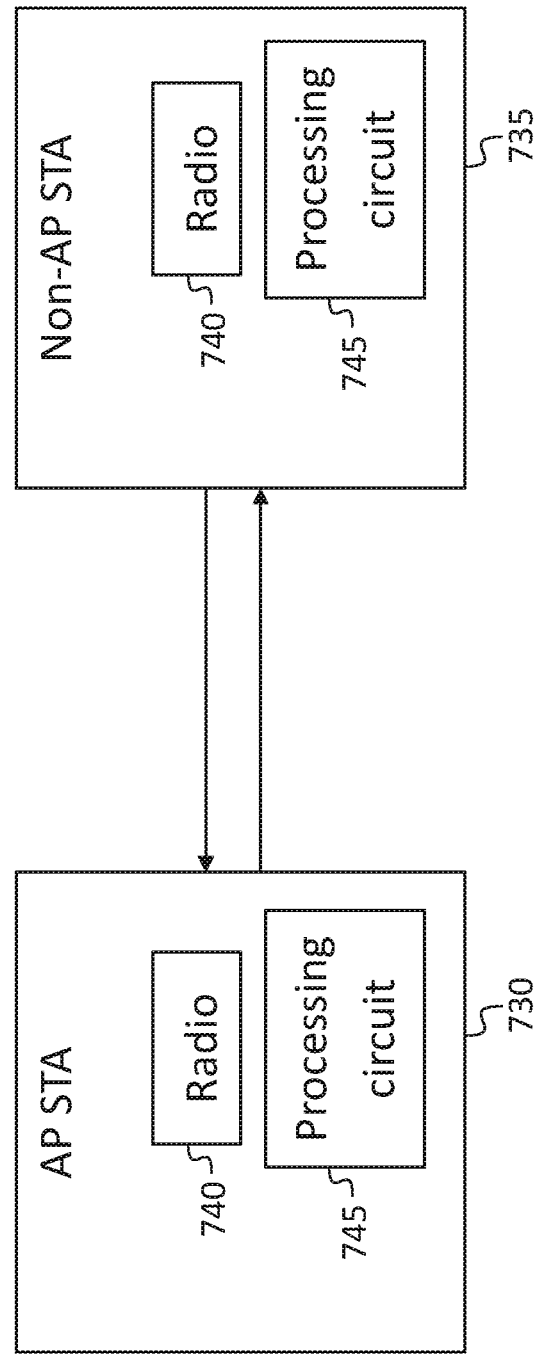

INSERTED PPDU

CROSS-REFERENCE TO RELATED APPLICATION(S)

The present application claims priority to and the benefit of U.S. Provisional Application No. 63/184,686, filed May 5, 2021, entitled "INSERTED PPDU/2D A-PPDU", the entire content of which is incorporated herein by reference.

FIELD

One or more aspects of embodiments according to the present disclosure relate to wireless communications, and more particularly to a system and method for managing latency in a wireless network.

BACKGROUND

Latency-sensitive applications may, in some circumstances, experience degraded performance when used with a WiFi system, which may introduce significant, and variable, latency, for example as a result of a need to wait for the transmission of a data unit to be completed before the transmission of a newly-received latency-sensitive packet may begin.

It is with respect to this general technical environment that aspects of the present disclosure are related.

SUMMARY

According to an embodiment of the present disclosure, there is provided a method, including: receiving, by a non-Access Point Station (non-AP STA), a first inserted packet; and sending, by the non-AP STA, an Acknowledgement (ACK) for the first inserted packet, the first inserted packet beginning after the beginning of a first originally scheduled Aggregated Physical layer Protocol Data Unit (A-PPDU) and being substituted for a portion of the data of the first originally scheduled A-PPDU.

In some embodiments, the method further includes detecting a start indication of the first inserted packet.

In some embodiments, the start indication includes a Long Training Field (LTF).

In some embodiments, the start indication includes a Signal Field (SIG).

In some embodiments, the A-PPDU includes a High Efficiency Physical layer Protocol Data Unit (HE PPDU), the HE PPDU having a frequency extent of 160 MHz.

In some embodiments, the first inserted packet occupies a bandwidth of at most 80 MHz.

In some embodiments, the method further includes receiving, in a preamble of the first originally scheduled A-PPDU, an indication of a candidate start time for the first inserted packet.

In some embodiments, the candidate start time is indicated as a number of symbols, the number of symbols specifying the time interval between the start of the first originally scheduled A-PPDU and the candidate start time.

In some embodiments, the method further includes: receiving, by the non-AP STA, a first portion of a second A-PPDU; and detecting, by the non-AP STA, the start of a second inserted packet.

In some embodiments, the method further includes turning off a radio of the non-AP STA after the start of the second inserted packet.

In some embodiments, the portion of the data of the first originally scheduled A-PPDU is a portion of the data of a Physical layer Protocol Data Unit (PPDU) of the first originally scheduled A-PPDU.

In some embodiments, the portion of the data of the first originally scheduled A-PPDU is a portion of the data of a Resource Unit (RU).

In some embodiments, the portion of the data of the first originally scheduled A-PPDU is a portion of the data of each of two Resource Units (RUs).

According to an embodiment of the present disclosure, there is provided a non-Access Point Station (non-AP STA) including: a radio; and a processing circuit, the processing circuit being configured to receive a first inserted packet, the first inserted packet beginning after the beginning of a first originally scheduled Aggregated Physical layer Protocol Data Unit (A-PPDU) and being substituted for a portion of the data of the first originally scheduled A-PPDU.

In some embodiments, the processing circuit is further configured to detect a start indication of the first inserted packet.

In some embodiments, the start indication includes a Long Training Field (LTF).

In some embodiments, the start indication includes a Signal Field (SIG).

In some embodiments, the processing circuit is further configured to send an Acknowledgement (ACK) for the first inserted packet.

In some embodiments, the A-PPDU includes a High Efficiency Physical layer Protocol Data Unit (HE PPDU), the HE PPDU having a frequency extent of 160 MHz.

According to an embodiment of the present disclosure, there is provided a non-Access Point Station (non-AP STA) including: a radio; and means for processing, the means for processing being configured to receive a first inserted packet, the first inserted packet beginning after the beginning of a first originally scheduled Aggregated Physical layer Protocol Data Unit (A-PPDU) and being substituted for a portion of the data of the first originally scheduled A-PPDU.

BRIEF DESCRIPTION OF THE DRAWINGS

These and other features and advantages of the present disclosure will be appreciated and understood with reference to the specification, claims, and appended drawings wherein:

FIG. 3 is a resource diagram showing three Resource Units (RUs), according to an embodiment of the present disclosure;

FIG. 4 is a resource diagram showing three Resource Units (RUs) with an inserted PPDU, according to an embodiment of the present disclosure;

FIG. 7A is a flow chart, according to an embodiment of the present disclosure; and FIG. 7B is a block diagram of a portion of a wireless system, according to an embodiment of the present disclosure.

DETAILED DESCRIPTION

Figure 1:
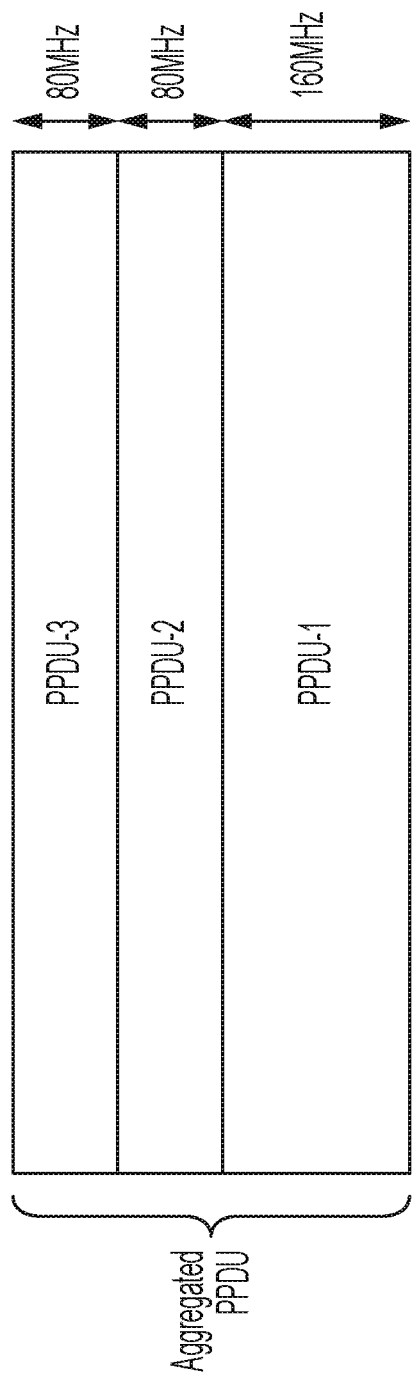
FIG. 1 is a resource diagram for a frequency-domain (FD) Aggregated Physical layer Protocol Data Unit (A-PPDU), according to an embodiment of the present disclosure.

The detailed description set forth below in connection with the appended drawings is intended as a description of exemplary embodiments of a system and method for managing latency in a wireless network provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

When a WiFi system is used for certain applications, it may be advantageous for the system to exhibit low, and consistent, latency, e.g., for certain latency-sensitive packets. In a system employing frequency-domain (FD) Aggregated Physical layer Protocol Data Units (A-PPDUs), forward compatible Orthogonal Frequency Division Multiple Access (OFDMA) may be employed, as discussed in Institute of Electrical and Electronics Engineers (IEEE) Document 802.11-20/674r3, entitled "Forward Compatible OFDMA". This may entail multiplexing between different generations of 802.11 PPDUs in the frequency domain, to improve scheduling flexibility and efficiency. Moreover, Aggregated PPDUs for large bandwidth (BW) may be employed, as discussed in 11-20/693r1, "Aggregated PPDU for Large BW", which may involve multiplexing between different BW capable Stations (STAs) in a PPDU in the frequency domain.

These operating modes may be transparent to legacy STAs. For example, at the Physical (PHY) layer, the Orthogonal Frequency Division Multiplexing (OFDM) numerology including symbol duration may be aligned, e.g., Extremely High Throughput (EHT) Multi-User (MU) PPDUs may be aligned with High Efficiency (HE) MU PPDUs, and EHT Trigger-Based (TB) PPDUs may be aligned with HE TB PPDUs. The Access Point STA (AP STA, or simply "AP") may align these using explicit signaling, such as "Number of EHT-SIG Symbols", (where SIG is a Signal Field) "Number of EHT-LTF Symbols" (where LTF is a Long Training Field), or "GI+LTF Size" (where GI is a Guard Interval). Moreover, SIG may be designed to support frequency domain multiplexing of different PPDUs, e.g., per 80 MHz Universal SIG (U-SIG) and EHT-SIG. Each HE PPDU may be required to be 160 MHz, otherwise the HE STA may decode the wrong L-Length; for EHT and EHT+PPDU multiplexing, however, there is no such restriction as long as it is 80 MHz granularity.

At the Media Access Control (MAC) layer, trigger frames may be designed to support frequency domain multiplexing of different PPDUs (as, for example, in the R1 Trigger frame design), and Subchannel Selective Transmission (SST) operation together with Transmit Wait Time (TWT).

In section 28.3.2.2 of the draft P802.11ay_D5.0 specification, an Enhanced Directional Multi-Gigabit (EDMG) A-PPDU is defined as follows. The EDMG A-PPDU is transmitted only to a single user and not to multiple users. Each subsequent PPDU includes the EDMG Header A and Data field only. The actual A-PPDU duration is unknown at the time of the L-Header transmission. Each EDMG-Header-A includes the length of the PLCP Service Data Unit (PSDU) length (where PLCP is the Physical Layer Convergence Procedure) and Additional EDMG PPDU subfield. The A-PPDU may be to the same user, as there is no EDMG Channel Estimation Field (EDMG-CEF) for the subsequent PPDUs.

As such, in some embodiments, a PPDU may be inserted into a partially transmitted A-PPDU. The insertion may be performed in a manner that is transparent to legacy STAs, including 802.11be R1 STAs. For example, a latency sensitive packet may be transmitted on an on-going PPDU, e.g., on an FD A-PPDU, to reduce latency. In some embodiments, only the necessary subchannel or subchannels is or are terminated; to avoid the waste that may occur if the entire 320 MHz PPDU were terminated to accommodate a latency-sensitive packet. As used herein, an "A-PPDU" includes one or more PPDUs. A portion of an A-PPDU may be one or more PPDUs, or one or more Resource Units (RUs). The one or more RUs may be a portion of a PPDU within an A-PPDU.

Figure 2:
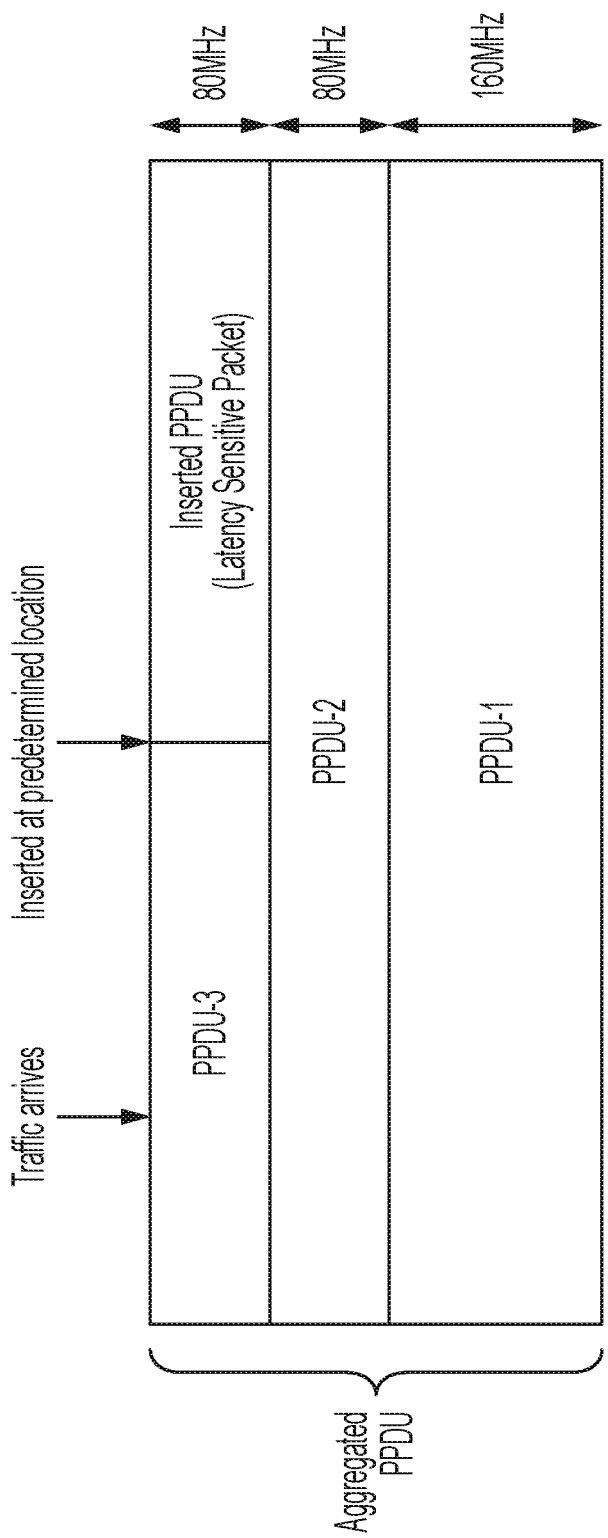
FIG. 2 is a resource diagram for an Aggregated Physical layer Protocol Data Unit with an inserted Physical layer Protocol Data Unit (PPDU), according to an embodiment of the present disclosure.

For example, FIG. 2 shows a two dimensional (2D) A-PPDU, into which a latency-sensitive packet has been inserted, part-way through the A-PPDU, in the uppermost subchannel. In some embodiments, the latency-sensitive packet is inserted with no impact on the operation of the original PPDU receiver, and with no change in the original PPDU or RU reception procedure. The entire PPDU may be ended as indicated by the L-Length.

The Acknowledgment (ACK) or Block Acknowledgment (BA) and other procedures followed by a PPDU may remain the same when a latency-sensitive packet is inserted; for example, the original PPDU recipient may send an ACK/BA as instructed. A portion of (the data portion of) the originally scheduled A-PPDU (PPDU-3 in FIG. 2) may be replaced by the latency-sensitive packet, and as a result, this portion of the originally scheduled A-PPDU may not be successfully received. The impact of this reception failure may be acceptable, as similar reception failures may occur in any event, as a result of Overlapping Basic Service Set (OBSS) interference. If the STA receiving the originally scheduled A-PPDU is a non-legacy STA (e.g., an 11be R2 or later STA), it may detect the start of the inserted PPDU (or "inserted packet"), turn off its radio, and stop decoding, thereby saving power.

The ACK/BA for the latency sensitive PPDU may be multiplexed using a Multi-user BlockAck Request (MU-BAR) included separately in the inserted PPDU, if unused resources are present in the MU-BAR of the originally scheduled A-PPDU. In another embodiment, the ACK/BA for the latency sensitive PPDU may be set to delayed ACK.

The A-PPDU may include an inserted start indication at the point at which the inserted PPDU is inserted. The use of a time-domain autocorrelation or cross correlation method may not be feasible unless only the potential subchannel is processed. As such, the start indication may instead use a frequency-domain method, such as the use of two repeated LTFs and the Cyclic Redundancy Check (CRC) of the SIG.

A predetermined candidate start time may be used, to reduce complexity at the receiver; this may be a slot based start time. As used herein, a "slot" is any fixed time-domain size of a resource; for example, a slot may be a fixed number of symbols. As used herein, a "predetermined candidate start time" is a time at which a latency-sensitive packet may or may not be inserted. The candidate start time is "predetermined" in the sense that it is specified before it occurs (e.g., it may be indicated in the preamble of the originally scheduled A-PPDU, or it may be specified in the standard). For example, the predetermined candidate start time may be a fixed number of OFDM symbols after the start of the originally scheduled A-PPDU.

In some embodiments, the potential insertion of a latency-sensitive packet and the candidate start time may be included in the SIG field of the originally scheduled A-PPDU. In some embodiments, a latency-sensitive packet is inserted in a high efficiency (HE) PPDU, in a Very High Throughput (VHT) PPDU, in a High Throughput (HT) PPDU, or in a non-HT PPDU.

Figure 5:
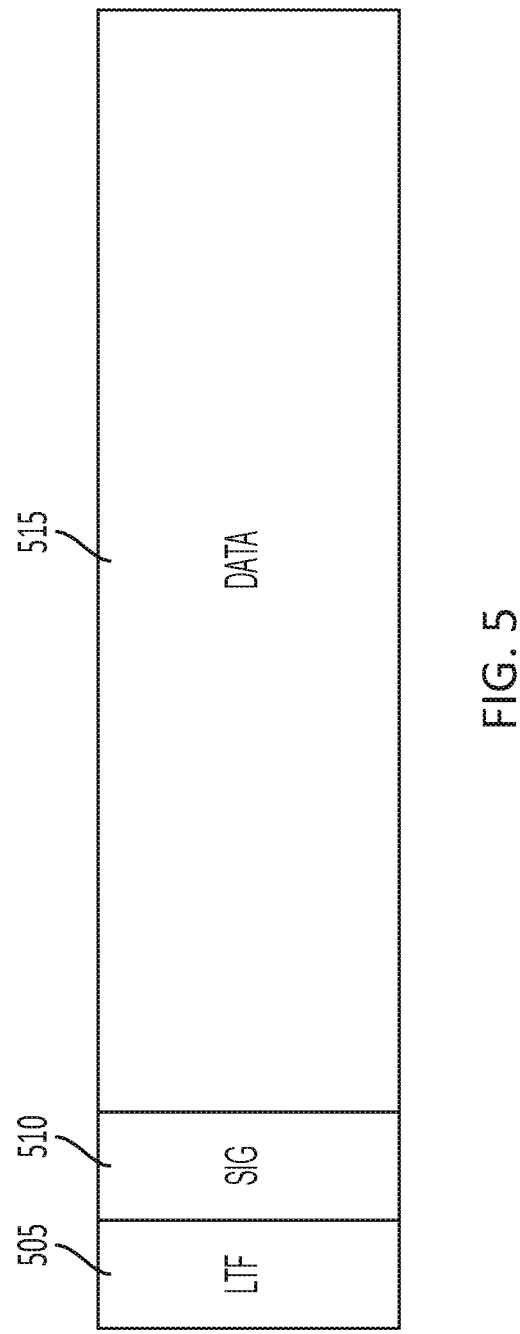
FIG. 5 is an illustration of the structure of an inserted PPDU, according to an embodiment of the present disclosure.

FIG. 5 shows the structure of an inserted PPDU, in some embodiments. The inserted PPDU may include an LTF 505, a SIG 510, and data 515, as shown. The maximum bandwidth of the inserted PPDU may be limited to 80 MHz; potential bandwidths may be 20 MHz, 40 MHz, 60 MHz, or 80 MHz. This limitation may simplify the receiver. The inserted PPDU may be required to include a predetermined 20 MHz subchannel, e.g., the primary 20 MHz subchannel.

OFDMA may be enabled within the inserted PPDU. For example, in FIG. 2, the inserted PPDU has a frequency extent of 80 MHz. The inserted PPDU may include multiple RUs as in FIG. 3, which shows three RUs and thus three users OFDMA. Resource sizes for OFDMA may be limited in such an embodiment. For example, the resource sizes may be limited to a 242-tone RU, a 484-tone RU, a 484+242-tone MRU, or a 996-tone RU. An EHT LTF and a SIG may be used as a start indication, signaling that a latency-sensitive packet has been inserted and also indicating the start of the inserted PPDU. The number of symbols for the EHT LTF may be fixed, e.g., at two symbols, and the number of symbols for the SIG may be fixed, e.g., at one symbol. The numerology for EHT LTF and SIG may be same as the original data symbol numerology.

A STA (e.g., a non-AP STA) expecting to receive a latency sensitive packet may check, at the predetermined candidate start time, for the existence of an EHT LTF. Beamforming may not be used, and the LTF may be a single stream LTF. A repeated single stream EHT LTF may be employed to enable easy LTF detection as well as Carrier Frequency Offset (CFO) and Common Phase Error (CPE) correction.

A STA (e.g., a non-AP STA) expecting to receive a latency sensitive packet may also check, at the predetermined candidate start time, for the existence of an inserted PPDU using a CRC in the SIG. The SIG may be encoded within a 20 MHz bandwidth of the inserted PPDU, and duplicated for different 20 MHz frequency ranges within the bandwidth of inserted PPDU. The SIG may be encoded using Modulation Coding Scheme 0 (MCS0), and include a total of 117 bits. The SIG may include (i) a PHY Version Identifier (3 bits), (ii) a Low-Density Parity-Check (LDPC) Extra Symbol Segment (1 bit), (iii) a Pre-FEC Padding Factor (2 bits), (iv) a Packet Extension (PE) Disambiguity bit (1 bit), (v) a Time Domain (TD) RU Allocation subfield (e.g. 5 bits; the number may be limited to use only some of the 5 bits), (vi) 5 Reserved Bits, (vii) four User Fields (the non-multi-user-multiple-input-multiple-output (non-MU-MIMO) allocation without a Number of Spatial Streams (NSS) and Beamformed, and 3 more reserved bits) (4×20 bits), and (viii) two (CRC+Tail) fields (20 bits).

The Time Domain (TD) RU Allocation subfield may signal the BW and puncturing information of the TD PPDU as well. Within each 20 MHz frequency range, there may be no allocation or one allocation of 242 tones. As such, there are 2×2×2×2=16 cases, for a maximum bandwidth of 80 MHz. For a 40 MHz 484-tone RU and two 20 MHz RUs, there are 2×2×2=8 cases; for 4 different 484-tone RUs and one 242-tone RU, there are 2×2=4 cases, and for a 80 MHz 996-tone RU there is 1 case. As such, the total number of possible cases is 29, and the case in use (from among the 29 possible cases) may be indicated using a 5-bit field.

Figure 6:
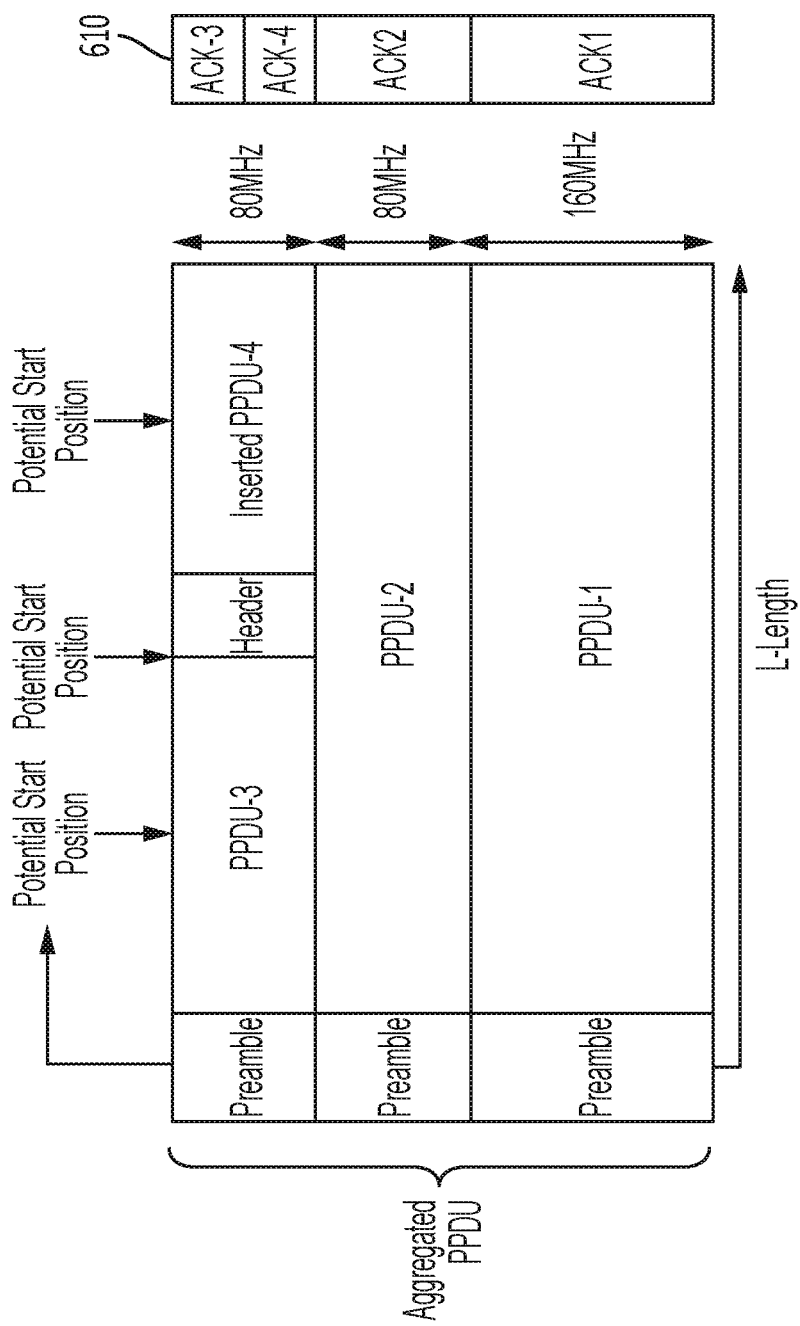
FIG. 6 is a resource diagram for an A-PPDU with an inserted PPDU, according to an embodiment of the present disclosure.

FIG. 6 shows an A-PPDU including an inserted PPDU, in some embodiments. The A-PPDU includes a first PPDU (PPDU-1), a second PPDU (PPDU-2), and a third PPDU (PPDU-3), each with a respective preamble. The third PPDU may include in its preamble an indication of the predetermined candidate start time, and, as illustrated, an inserted PPDU begins (with a header which may include an LTF field and a SIG field) at the predetermined candidate start time. After decoding of the PPDUs is complete, block acknowledgements (BAs) may be sent at 610, indicating successful or unsuccessful decoding.

FIG. 7A is a flowchart, according to some embodiments. As illustrated, the AP STA receives, at 705, a first inserted packet. The first inserted packet may begin after the beginning of a first originally scheduled A-PPDU and may be substituted for a portion of the data of the first originally scheduled A-PPDU. FIG. 7B shows a system including an AP STA 730 and a non-AP STA 735, in communication with each other. Each of the AP STA and the non-AP STA may include a respective radio 740 and a respective processing circuit (or a means for processing) 745, which may perform various methods disclosed herein, e.g., the processing circuit 745 of the non-AP STA 735 may perform (using the radio 740 of the non-AP STA 735) the method illustrated in FIG. 7A. In other examples, the processing circuit 745 of the non-AP STA 735 may receive, via the radio 740 of the non-AP STA 735, transmissions from the AP STA 730, and the processing circuit 745 of the non-AP STA 735 may transmit, via the radio 740 of the non-AP STA 735, signals to the AP STA 730.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

The terms "processing circuit" and "means for processing" are used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of a system and method for managing latency in a wireless network have been specifically described and illustrated herein, many modifications and variations will be apparent to those skilled in the art. Accordingly, it is to be understood that a system and method for managing latency in a wireless network constructed according to principles of this disclosure may be embodied other than as specifically described herein. The invention is also defined in the following claims, and equivalents thereof.

What is claimed is:

1. A method, comprising:
   receiving, by a non-Access Point Station (non-AP STA), a first inserted packet; and
   sending, by the non-AP STA, an Acknowledgement (ACK) for the first inserted packet,
   the first inserted packet beginning during transmission of a first originally scheduled Aggregated Physical layer Protocol Data Unit (A-PPDU) and being substituted for a portion of the data of the first originally scheduled A-PPDU.

2. The method of claim 1, further comprising detecting a start indication of the first inserted packet.

3. The method of claim 2, wherein the start indication includes a Long Training Field (LTF).

4. The method of claim 2, wherein the start indication includes a Signal Field (SIG).

5. The method of claim 1, wherein the A-PPDU comprises a High Efficiency Physical layer Protocol Data Unit (HE PPDU), the HE PPDU having a frequency extent of 160 MHz.

6. The method of claim 1, wherein the first inserted packet occupies a bandwidth of at most 80 MHz.

7. The method of claim 1, further comprising receiving, in a preamble of the first originally scheduled A-PPDU, an indication of a candidate start time for the first inserted packet.

8. The method of claim 7, wherein the candidate start time is indicated as a number of symbols, the number of symbols specifying the time interval between the start of the first originally scheduled A-PPDU and the candidate start time.

9. The method of claim 1, further comprising:
   receiving, by the non-AP STA, a first portion of a second A-PPDU; and
   detecting, by the non-AP STA, the start of a second inserted packet.

10. The method of claim 9, further comprising turning off a radio of the non-AP STA after the start of the second inserted packet.

11. The method of claim 1, wherein the portion of the data of the first originally scheduled A-PPDU is a portion of the data of a Physical layer Protocol Data Unit (PPDU) of the first originally scheduled A-PPDU.

12. The method of claim 1, wherein the portion of the data of the first originally scheduled A-PPDU is a portion of the data of a Resource Unit (RU).

13. The method of claim 1, wherein the portion of the data of the first originally scheduled A-PPDU is a portion of the data of each of two Resource Units (RUS).

14. A non-Access Point Station (non-AP STA) comprising:
   a radio; and
   a processing circuit,
   the processing circuit being configured to receive a first inserted packet,
   the first inserted packet beginning during transmission of a first originally scheduled Aggregated Physical layer Protocol Data Unit (A-PPDU) and being substituted for a portion of the data of the first originally scheduled A-PPDU.

15. The non-AP STA of claim 14, wherein the processing circuit is further configured to detect a start indication of the first inserted packet.

16. The non-AP STA of claim 15, wherein the start indication includes a Long Training Field (LTF).

17. The non-AP STA of claim 15, wherein the start indication includes a Signal Field (SIG).

18. The non-AP STA of claim 14, wherein the processing circuit is further configured to send an Acknowledgement (ACK) for the first inserted packet.

19. The non-AP STA of claim 14, wherein the A-PPDU comprises a High Efficiency Physical layer Protocol Data Unit (HE PPDU), the HE PPDU having a frequency extent of 160 MHz.

20. A non-Access Point Station (non-AP STA) comprising:
   a radio; and
   means for processing,
   the means for processing being configured to receive a first inserted packet,
   the first inserted packet beginning during transmission of a first originally scheduled Aggregated Physical layer Protocol Data Unit (A-PPDU) and being substituted for a portion of the data of the first originally scheduled A-PPDU.

\* \* \* \* \*